United States Patent
Au et al.

(10) Patent No.: US 8,982,947 B2
(45) Date of Patent: Mar. 17, 2015

(54) RATE CONTROL AND VIDEO DENOISING FOR NOISY VIDEO DATA

(75) Inventors: Oscar Chi Lim Au, Kowloon (HK); Yan Chen, Kowloon (HK)

(73) Assignee: The Hong Kong University of Science and Technology, Kowloon, Hong Kong (CN)

( * ) Notice: Subject to any disclaimer, the term of this patent is extended or adjusted under 35 U.S.C. 154(b) by 1824 days.

(21) Appl. No.: 12/219,375

(22) Filed: Jul. 21, 2008

(65) Prior Publication Data

US 2009/0080518 A1    Mar. 26, 2009

Related U.S. Application Data

(60) Provisional application No. 60/929,992, filed on Jul. 20, 2007.

(51) Int. Cl.
| | |
|---|---|
| H04N 7/12 | (2006.01) |
| H04N 19/176 | (2014.01) |
| H04N 19/147 | (2014.01) |
| H04N 19/61 | (2014.01) |
| H04N 19/124 | (2014.01) |

(52) U.S. Cl.
CPC ... *H04N 19/00278* (2013.01); *H04N 19/00175* (2013.01); *H04N 19/00781* (2013.01); *H04N 19/0009* (2013.01)
USPC ................................. 375/240.03

(58) Field of Classification Search
CPC ................... H04N 19/0009; H04N 19/00175; H04N 19/00278; H04N 19/00781
USPC .................... 375/240.01–240.29, 240.03
IPC ......................................................... H04N 7/12
See application file for complete search history.

(56) References Cited

U.S. PATENT DOCUMENTS

| | | | |
|---|---|---|---|
| 7,206,459 B2 | 4/2007 | Berkner et al. | |
| 7,221,709 B2 | 5/2007 | Yanagihara et al. | |
| 7,227,898 B2 | 6/2007 | Yanagihara et al. | |
| 7,643,695 B2 * | 1/2010 | Nakayama | 382/251 |

(Continued)

OTHER PUBLICATIONS

Amer, et al. "A new video noise reduction algorithm using spatial subbands". in Proc. IEEE International Conference on Electronics, Circuits, and Systems. Oct. 1996. vol. 1, pp. 45-48. Rodos, Greece.

(Continued)

*Primary Examiner* — Jessica M Prince
(74) *Attorney, Agent, or Firm* — Nath, Goldberg & Meyer; Jerald L. Meyer; Stanley N. Protigal

(57) ABSTRACT

A method and a computer-readable medium containing computer program for simultaneously performing rate control and video denoising for video corrupted by noise are presented. Video data includes original video data and noise data. A variance of the noise data for each macroblock within a frame is estimated. Based on the estimated noise variance, a low bound quantization parameter is generated. The video data are reconstructed such that the distortion between the original video data and reconstructed video data is minimized over each macroblock within a frame. The minimization of the distortion between the original video and reconstructed video data is implemented using a quantization parameter that is equal to or larger than the low bound quantization parameter.

16 Claims, 11 Drawing Sheets

(a)

(b)

(56) References Cited

U.S. PATENT DOCUMENTS

| | | | |
|---|---|---|---|
| 7,936,818 B2 * | 5/2011 | Jayant et al. | 375/240.05 |
| 8,265,172 B2 * | 9/2012 | Yang et al. | 375/240.27 |
| 2005/0249287 A1 * | 11/2005 | Kondo et al. | 375/240.16 |
| 2005/0281479 A1 * | 12/2005 | Song | 382/275 |
| 2007/0110202 A1 * | 5/2007 | Casler et al. | 375/354 |

OTHER PUBLICATIONS

Song, et al. "Motion-compensated noise estimation for efficient pre-filtering in a video encoder". in Proc. of IEEE. International Conference on Image Processing. vol. 2, pp. 14-17, Sep. 2003. Digital Media R&D Center, Samsung Electronics Co., Ltd. Republic of Korea.

Chen, et al. "Maximum a posteriori based (map-based) video denoising via rate distortion optimization". in Proc. IEEE International Conference on Multimedia and Expo. 2007, pp. 1930-1933. Dept. Electronic and Computer Engineering Hong Kong University of Science and Technology, Hong Kong.

Wiegand, et al. "Rate-constrained coder control and comparison of video coding standards". IEEE Transactions on Circuits and Systems for Video Technology. Jul. 2003, vol. 13, No. 7, pp. 688-703. publisher and city unknown.

Wiegand, et al. "Draft ITU-T Recommendation and Final Draft International Standard of Joint Video Specification (ITU-T rec. H.264 | ISO/IEC 14496-10 AVC)". Joint Video Team (JVT) of ISO/IEC MPEG & ITU-T VCEG (ISO/IEC JTC1/SC29/WG11 and ITU-T SG16 Q.6). 8$^{th}$ Meeting: Geneva, Switzerland, May 23-27, 2007, pp. i-xy and 1-253, Document: JVT-G050r1.

* cited by examiner (a)          (b)

(A)

(B)

(C)

(D)

RATE CONTROL AND VIDEO DENOISING FOR NOISY VIDEO DATA

CROSS-REFERENCE TO RELATED APPLICATIONS

This application claims the benefit of U.S. Provisional Application No. 60/929,992, filed Jul. 20, 2007, which is hereby incorporated herein by reference in its entirety.

FIELD OF THE INVENTION

The present subject matter relates to simultaneously performing rate control and video denoising for video partly or fully corrupted by noise.

BACKGROUND OF THE INVENTION

Due to the huge size of raw digital video data or image sequences, compression may be applied to such data so that they may be transmitted and stored. Hybrid video coding scheme is the most common video coding scheme. It utilizes motion estimation (ME), discrete cosine transform (DCT)-based transform, and entropy coding to exploit temporal, spatial, and data redundancies, respectively. Most of the existing video coding standards conform to this hybrid scheme, such as ISO/IEC MPEG-1, MPEG-2, and MPEG-4 standards, and ITU-T H.261, H.263, and H.264 standards. ISO/IEC MPEG-1 and MPEG-2 standards are used extensively by the entertainment industry to distribute movies, in the form of applications such as video compact disks (VCDs) (MPEG-1), digital video or digital versatile disks (DVDs) (MPEG-2), recordable DVDs (MPEG-2), digital video broadcast (DVB) (MPEG-2), video-on-demands (VODs) (MPEG-2), high definition television (HDTV) in the US (MPEG-2), etc. MPEG-4 is more advanced than MPEG-2 and can achieve high quality video at lower bit rate, making it suitable for video streaming over internet, digital wireless network (e.g. 3G network), multimedia messaging service (MMS standard from 3GPP), etc. MPEG-4 is accepted for the next generation high definition DVD (HD-DVD) standard and the MMS standard. ITU-T H.261, H.263, and H.264 standards are designed mainly for low-delay video phones and video conferencing systems. The earlier H.261 standard was designed to operate at bit rates of p*64 kbit/s, with p=1, 2, ..., 31. The later H.263 standard is successful and widely used in modern video conferencing systems, and video streaming in broadband and wireless networks, including the multimedia messaging service (MMS) in 2.5G and 3G networks and beyond. The latest H.264 (also called MPEG-4 Ver. 10 or MPEG-4 AVC) is currently the state-of-the-art video compression standard. It is so powerful that the Moving Picture Experts Group (MPEG) decided to jointly develop the standard with the International Telecommunication Union (ITU) Telecommunication Standardization Sector (ITU-T) in the framework of the Joint Video Team (JVT). The new standard is called H.264 in ITU-T and is called MPEG-4 Advance Video Coding (MPEG-4 AVC) or MPEG-4 Version 10 in ISO/IEC. H.264 is used in the HD-DVD standard, Direct Video Broadcast (DVB) standard, MMS standard, etc. Based on H.264,.a related standard called the Audio Visual Standard (AVS) is currently under development in China. AVS 1.0 is designed for high definition television (HDTV). AVS-M is designed for mobile applications. Other related standards may be under development as well.

H.264 has superior objective and subjective video quality over MPEG-1, MPEG-2, and MPEG-4, and H.261 and H.263. The basic encoding algorithm of H.264 (Joint Video Team of ITU-T and ISO/IEC JTC 1, "Draft ITU-T Recommendation and Final Draft International Standard of Joint Video Specification (ITU-T Rec. H.264 | ISO/IEC 14496-10 AVC)," document JVT-G050r1, May 2003) is similar to H.263 or MPEG-4 except that integer 4×4 DCT is used instead of the traditional 8×8 DCT. There are additional features of the H.264 standard including intra-prediction mode for I-frames, multiple block sizes and multiple reference frames for motion estimation/compensation, quarter pixel accuracy for motion estimation, in-loop deblocking filter, context adaptive binary arithmetic coding, etc.

The above-mentioned traditional block-based motion compensated video encoders, e.g. H.263, H.264, are specially designed for the compression of clean video sequences. However, when the input video sequences are corrupted by noise, these encoders may have some problems, e.g. they may generate bitstreams with high bitrate but poor peak signal-to-noise ratio (PSNR) performance. Moreover, the visual quality of output reconstructed video sequences may be noisy. There is a need to address the rate control and denoising problems for the video sequences partially or fully corrupted by Gaussian noise as shown in FIGS. 1(a) and 1(b). In this work, a simultaneously rate controlling and video denoising approach using rate distortion optimization is proposed.

SUMMARY OF THE INVENTION

The present subject matter provides a method for simultaneously performing rate control and video denoising for video corrupted by noise, comprising the steps of: receiving video data (I″) including original video data (I) and noise data (n); estimating a variance of the noise data for each macroblock within a frame; generating a low bound quantization parameter ($QP_{lowbound}$) based on the estimated noise variance; and reconstructing the video data such that the distortion between the original video data (I) and reconstructed video data (Î″) is minimized over each macroblock within a frame.

According to another aspect, the subject matter includes a method for encoding noisy video signals, comprising the steps of: receiving video data (I″) including original video data (I) and noise data (n); determining a variance of the noise data for each macroblock; determining a low bound quantization parameter ($QP_{lowbound}$) based on the noise variance; and controlling the bitrate of output bitstreams and the quality of reconstructed video data (Î″) based on the low bound quantization parameter.

According to further aspect, the subject matter includes a computer-readable medium containing a computer program for encoding noisy video data that include original video data and noise data, said computer program comprising: first code for estimating a variance of the noise data for each macroblock within a frame; second code for generating a low bound quantization parameter based on the estimated noise variance; and third code for reconstructing the video data such that the distortion between the original video data and reconstructed video data is minimized over each macroblock within a frame.

In an embodiment of the present method, the minimization of the distortion between the original video data and reconstructed video data is implemented using a quantization parameter (QP) that is equal to or larger than the low bound quantization parameter ($QP_{lowbound}$).

In another embodiment of the present method, the steps of determining the low bound quantization parameter and controlling the bitrate of output bitstreams and the quality of reconstructed video data are implemented by a same component.

According to still further aspect, the subject matter includes a method for simultaneously performing rate control and video denoising for video corrupted by noise, comprising the steps of: receiving video data ($I''$) including original video data (I) and noise data (n); and reconstructing the video data such that the distortion between the original video data (I) and reconstructed video data ($\hat{I}''$) is minimized by determining the optimal value ($R_t$) for the bitrate of each Macroblock.

BRIEF DESCRIPTION OF THE DRAWINGS

These and other aspects of the subject matter will be apparent with reference to the examples in the following description and with reference to the accompanying drawings, wherein

FIG. 7(a) original frame; FIG. 7(b) noisy frame with spatially varying noise variance; FIG. 7(c) and FIG. 7(d) reconstructed by using constant QP=24 and QP=32, respectively, where the corresponding average (bitrate kb/s, PSNR dB) are (432.67, 33.37) and (97.72, 32.43); FIG. 7(e) and FIG. 7(f) reconstructed using the proposed adaptive QP rate control method, where the corresponding average (bitrate kb/s, PSNR dB) are (461.53, 40.51) and (98.04, 35.86).

FIG. 8 shows rate distortion performance comparison between a method using H.264 and the proposed method.

FIG. 9(a) original frames; FIG. 9(b) noisy frames with spatially varying noise variance; FIG. 9(c) reconstructed frames using H.264, where the corresponding average (bitrate kb/s, PSNR dB) are (301.26, 34.70); and FIG. 9(d) reconstructed frames using the proposed method, where the corresponding average (bitrate kb/s, PSNR dB) are (298.42, 41.27).

FIG. 10(a) original frames; FIG. 10(b) noisy frames with spatially varying noise variance; FIG. 10(c) reconstructed frames using H.264, where the corresponding average (bitrate kb/s, PSNR dB) are (300.27, 32.85); and FIG. 10(d) reconstructed frames using the proposed method, where the corresponding average (bitrate kb/s, PSNR dB) are (293.55, 40.48).

DETAILED DESCRIPTION OF THE INVENTION

Problem Formulation

The video corrupted by additive Gaussian noise can be formulated as following:

$$I''=I+n \qquad (1)$$

where $I=[I_1, I_2 \ldots I_k, I_{k+1} \ldots I_m]^T$ is the original (ideal) video while $I_k$ is the k-th frame, $n=[n_1, n_2 \ldots n_k, n_{k+1} \ldots n_m]^T$ is the additive Gaussian noise, and $I''=[hd\ 1'', I_2'' \ldots I_m'']^T$ is the noisy observation of the video. Here, each frame has N pixels. In this case, $I_k$, $n_k$, $I_k''$ are all length-N vectors.

Figure 1:
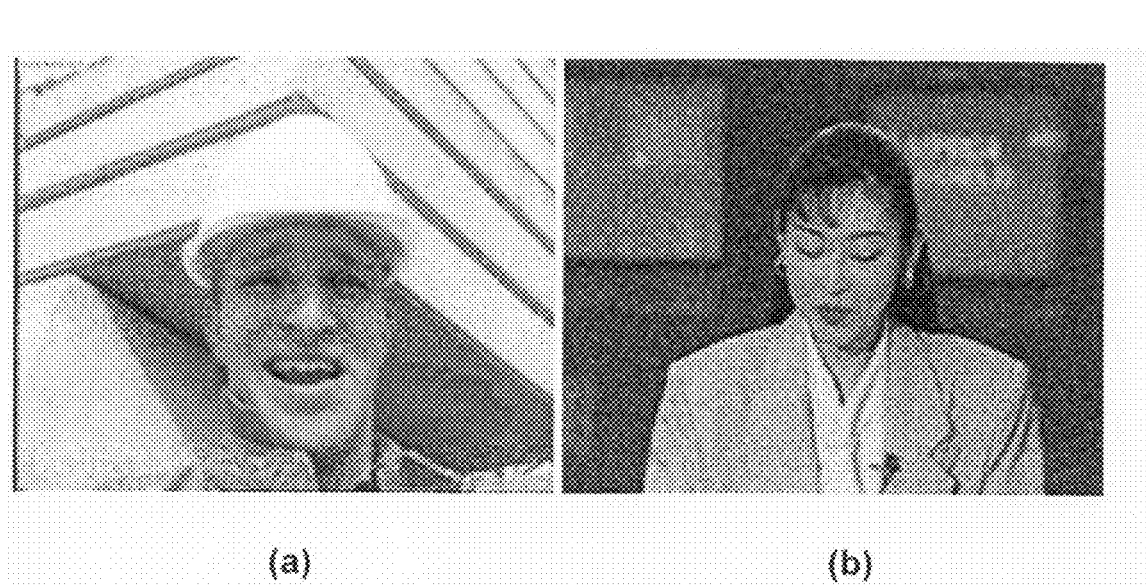
FIG. 1(a) shows video sequences partially corrupted by noise.
FIG. 1(b) shows video sequences fully corrupted by noise.
Figure 2:
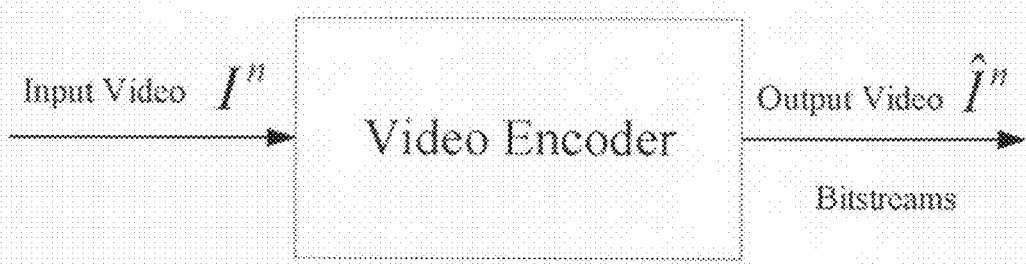
FIG. 2 is a block diagram showing a video encoder.

The video denoising problem is designed to find an estimate $\hat{I}$ from the original video based on the noisy observation $I''$. From Y. Chen et al., "Maximum a posteriori based (map-based) video denoising via rate distortion optimization," in Proc. IEEE International Conference on Multimedia and Expo, 2007, it is known that the denoising problem can be regarded as a rate distortion optimization problem under some appropriate assumptions, which means that it is possible to perform video denoising through video encoders. However, directly inputting the noisy video to the video encoder, as shown in FIG. 2, may result in generation of bitstreams with high bitrate but poor PSNR performance, as shown FIG. 3. In order to avoid this case, one should carefully choose the parameter of the video encoder.

Figure 3:
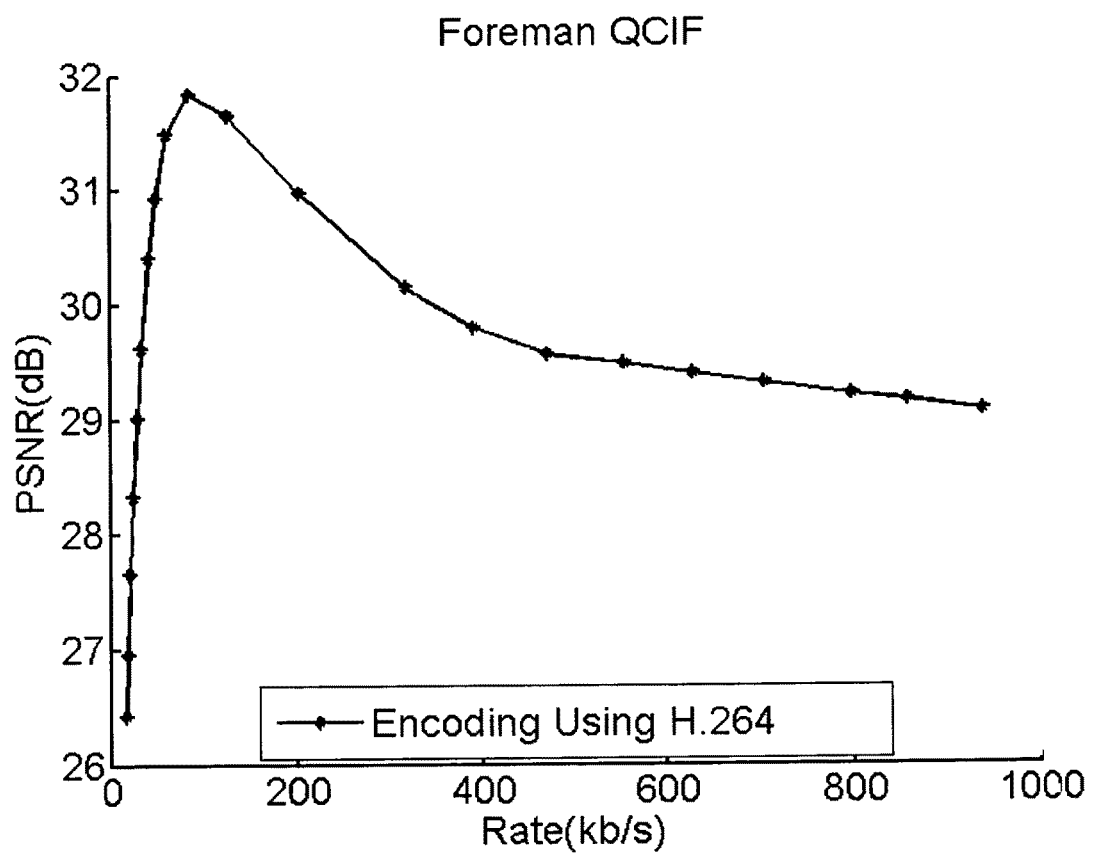
FIG. 3 shows rate distortion performance of H.264 for noisy video.

In a traditional block-based motion compensated video encoder, the rate-distortion optimization model for a macroblock p is defined as follows:

$$S_p^* = \underset{S_p}{\operatorname{argmin}} D(p, S_p) + \lambda(Q) R_p(S_p) \qquad (2)$$

$$\hat{I}_p = \hat{I}_p^n(S_p^*)$$

where Sp=[mode, motion vector, reference index, quantization parameter] denotes the vector of coding decisions for the macroblock p. Among these, the most important parameter is a quantization parameter QP since using too small QP will output the bitstream with high bitrate but poor PSNR performance, as shown in FIG. 3. In the following, it will be first described in detail about how to generate the low bound quantization parameter $QP_{lowbound}$. A QP which is smaller than $QP_{lowbound}$ will output unreasonable bitstreams with a larger bit rate and larger distortion. Then, it will be described about the proposed algorithm in detail. Finally, it will be described about several experiments to demonstrate the efficiency and effectiveness of the proposed method.

Low Bound Quantization Parameter QPlowbound

For denoising purpose, one way to denoise is to minimize the distortion between the original data I and the reconstructed version $\hat{I}''$. It is assumed that minimizing over the whole frame is equivalent to minimizing over each marcoblock (MB) within the frame independently, ignoring any dependency among MBs. In the following, the reconstructed distortion $E(D_p)$ for MB p is defined as the expectation of the square difference between the original pixel $I_i$ and the reconstructed one $\hat{I}_i''$.

$$\begin{aligned}
E(D_p) &= E\left[\sum_{i \in MB_p} \left(I_i - \hat{I}_i^n\right)^2\right] \qquad (3) \\
&= \sum_{i \in MB_p} \left[E\left(I_i - I_i^n + I_i^n - \hat{I}_i^n\right)^2\right] \\
&= \sum_{i \in MB_p} \left[E\left(I_i^n - \hat{I}_i^n - n_i\right)^2\right] \\
&= \sum_{i \in MB_p} \left\{E\left(I_i^n - \hat{I}_i^n\right)^2 - 2 \times E\left[\left(I_i^n - \hat{I}_i^n\right)n_i\right] + E(n_i)^2\right\}
\end{aligned}$$

-continued $$= \sum_{i \in MB_p} (D_i^q - 2 \times D_i^{qn} + \sigma_n^2)$$

where $D_i^q = E(I_i^n - \hat{I}_i^n)^2$ is the quantized distortion, $D_i^{qn} = E[9I_i^n - \hat{I}_i^n)n_i]$ is the correlation between the quantized error $I_i^n - \hat{I}_i^n$ and the noise $n_i$.

Figure 4A:
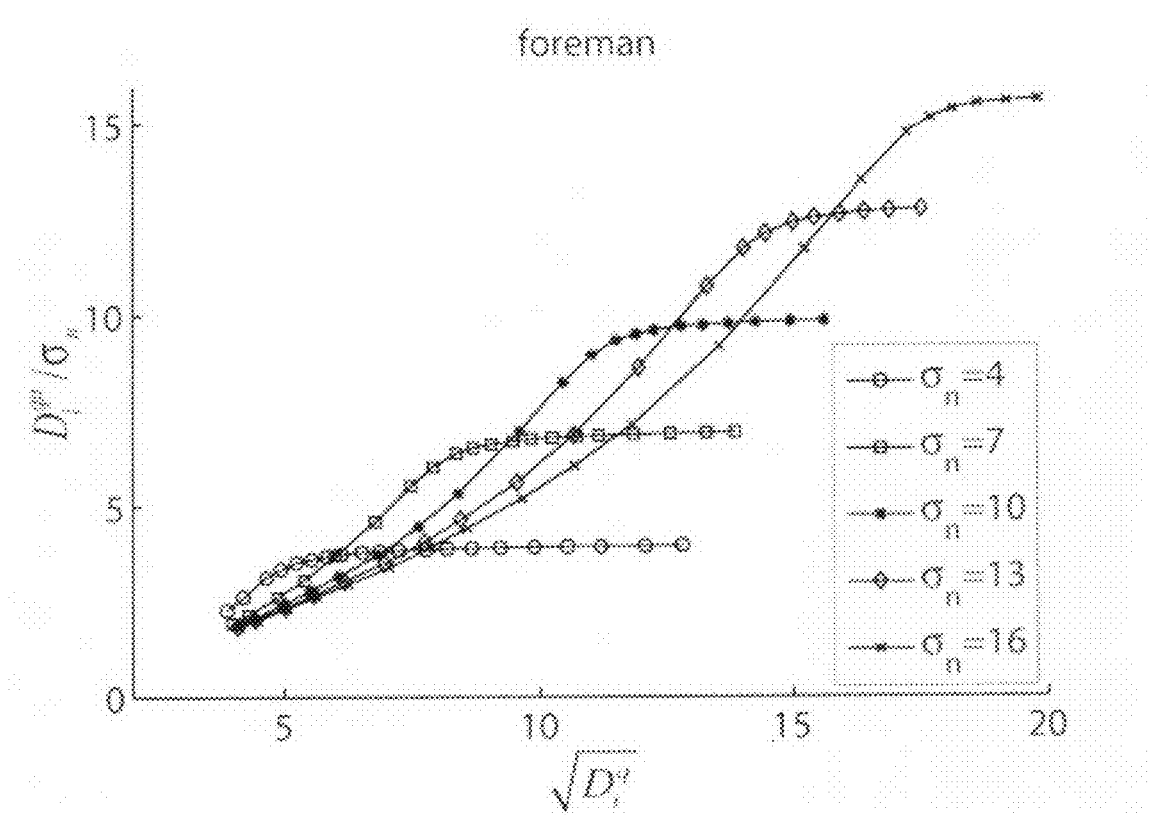
FIG. 4(a) shows the relationship between the correlation $D_i^{qn}$ and the square root of the quantization distortion $\sqrt{D_i^q}$ in "foreman" sequence.
Figure 4B:
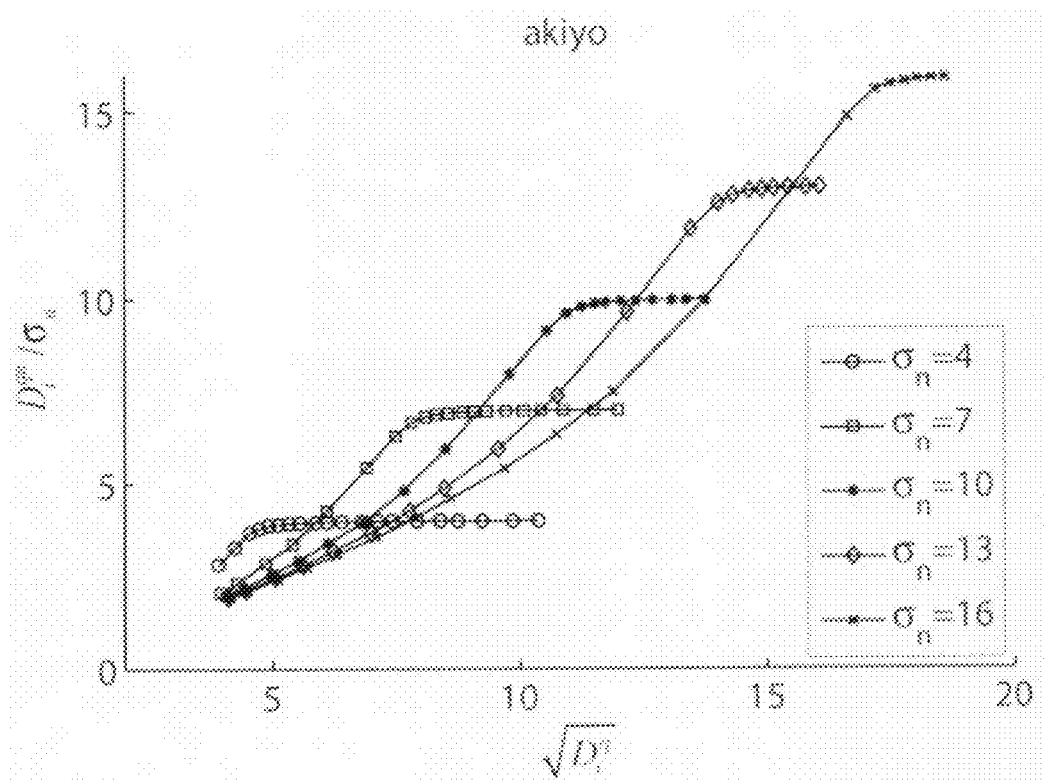
FIG. 4(b) shows the same in "akiyo" sequence.

From Equation (3), it can be seen that the expected distortion $E(D_p)$ is a function of the quantization distortion $D_i^q$ and the correlation $D_i^{qn}$. In order to minimize $E(D_p)$, Applicants derived the relation between $D_i^q$ and $D_i^{qn}$ through experimental results. Applicants used the first 50 frames of "foreman" and "akiyo" sequences for training. The relationship between $D_i^q$ and $D_i^{qn}$ is shown in FIG. 4. From FIG. 4, $D_i^{qn}$ can be approximated as a function of $\sqrt{D_i^q}$:

$$D_i^{qn} = \begin{cases} a_1^n \left(\sqrt{D_i^q} - a_2^n\right)^2 + a_3^n, & \text{for } \sqrt{D_i^q} < b^n \\ a_1^n (b^n - a_2^n)^2 + a_3^n, & \text{for } \sqrt{D_i^q} \geq b^n \end{cases} \quad (4)$$

where $a_1^n$, $a_2^n$, $a_3^n$, amd $b^n$ are parameters determined by the noise variance. Once the noise variance is fixed, they are constant. Moreover, from FIG. 4, we can see that $a_1^n$ and $b^n$ are both positive.

According to the Equation (4), we can re-write E(Dp) as:

$$E(D_p) = \qquad (5)$$
$$\begin{cases} \sum_{i \in MB_p} \left\{ D_i^q - 2\sigma_n \left[ a_1^n \left(\sqrt{D_i^q} - a_2^n\right)^2 + a_3^n \right] + \sigma_n^2 \right\}, & \text{for } \sqrt{D_i^q} \leq b^n \\ \sum_{i \in MB_p} \{D_i^q - 2\sigma_n [a_1^n (b^n - a_2^n)^2 + a_3^n] + \sigma_n^2\}, & \text{for } \sqrt{D_i^q} \geq b^n \end{cases}$$

From the equation above, we can see that $E(D_p)$ is a piecewise function of $\sqrt{D_i^q}$. In the following, we derive the minimal value of $E(D_p)$ for each region.

1) Case one $\sqrt{D_i^q} \geq b^n$:

$$E(D_p) = \sum_{i \in MB_p} \{D_i^q - 2\sigma_n [a_1^n (b^n - a_2^n)^2 + a_3^n] + \sigma_n^2\}$$

is a monotonic increase function of $\sqrt{D_i^q}$ when $\sqrt{D_i^q} \geq b^n > 0$. Therefore, the minimal value of $E(D_p)$ is achieved when $\sqrt{D_i^q} = b^n$. Here, the minimal value is:

$$E(D_p)_{min} = \sum_{i \in MB_p} \{(b^n)^2 - 2\sigma_n [a_1^n (b^n - a_2^n)^2 + a_3^n] + \sigma_n^2\}, \text{ when } \quad (6)$$

$$\sqrt{D_i^q} = b^n$$

2) Case two $\sqrt{D_i^q} \leq b^n$: If $\sqrt{D_i^q} \leq b^n$, $$E(D_p) = \sum_{i \in MB_p} \left\{ D_i^q - 2\sigma_n \left[ a_1^n \left(\sqrt{D_i^q} - a_2^n\right)^2 + a_3^n \right] + \sigma_n^2 \right\}$$

is a second order function of $\sqrt{D_i^q}$. By taking the first and second order derivatives over $\sqrt{D_i^q}$, we can get:

$$\frac{\partial E(D_p)}{\partial \sqrt{D_i^q}} = 2\sqrt{D_i^q} - 2\sigma_n 2 a_1^n \left(\sqrt{D_i^q} - a_2^n\right), \qquad (7)$$

with $$\sqrt{D_i^q} \leq b^n.$$

$$\frac{\partial^2 E(D_p)}{\partial^2 \sqrt{D_i^q}} = 2 - 4 a_1^n \sigma_u,$$

with $$\sqrt{D_i^q} \leq b^n.$$

Let $\dfrac{\partial E(D_p)}{\partial \sqrt{D_i^q}} = 0$, we can get:

$$\sqrt{D_i^q} = \frac{2 a_1^n \sigma_n a_2^n}{2 a_1^n \sigma_n - 1} \qquad (8)$$

Since $2 a_i^n \sigma_n \gg 1$, $$\frac{\partial^2 E(D_p)}{\partial^2 \sqrt{D_i^q}} = 2 - 4 a_1^n g_n < 0.$$

$E(D_p)$ achieves its maximal value at $$\sqrt{D_i^q} = \frac{2 a_1^n \sigma_n a_2^n}{2 a_1^n \sigma_n - 1}.$$

Also, $E(D_p)$ is monotonic increasing when $$0 \leq \sqrt{D_i^q} \leq \frac{2 a_1^n \sigma_n a_2^n}{2 a_1^n \sigma_n - 1},$$

and monotonic decreasing when $$\frac{2 a_1^n \sigma_n a_2^n}{2 a_1^n \sigma_n - 1} \leq \sqrt{D_i^q} \leq b^n.$$

Therefore, the minimal value of $E(D_p)$ is achieved at either $\sqrt{D_i^q} = 0$ or $\sqrt{D_i^q} = b^n$.

$$E(D_P)|_{\sqrt{D_i^q}=0} = 0 - 2\sigma_n[a_1^n(0-a_2^n)^2 + a_3^n] + \sigma_n^2. \qquad (9)$$

$$E(D_P)|_{\sqrt{D_i^q}=b^n} = (b^n)^2 - 2\sigma_n[a_1^n(b^n-a_2^n)^2 + a_3^n] + \sigma_n^2.$$

According to FIG. 4, we can see that $2a_i^n \sigma_n \gg 1$ and $$b^n > 2\frac{2\sigma_n a_1^n}{2\sigma_n a_1^n - 1} a_2^n.$$

Thus, $$\left[E(D_P)|_{\sqrt{D_i^q}=b^n} - E(D_P)|_{\sqrt{D_i^q}=0}\right] =$$
$$(b^n)^2 - 2\sigma_n[a_1^n(b^n-a_2^n)^2 + a_3^n] + \sigma_n^2 - \{0 - 2\sigma_n[a_1^n(0-a_2^n)^2 + a_3^n] + \sigma_n^2\} =$$
$$b^n[b^n(1-2\sigma_n a_1^n) + 4\sigma_n a_1^n a_2^n] <$$
$$b^n\left[2\frac{2\sigma_n a_1^n}{2\sigma_n a_1^n - 1} a_2^n(1-2\sigma_n a_1^n) + 4\sigma_n a_1^n a_2^n\right] < 0$$

Therefore, the minimal value of E(Dp) is achieved when $\sqrt{D_i^q}=b^n$. Here, the minimal value is:

$$E(D_P)_{min} = \sum_{i \in MB_p} \{(b^n)^2 - 2\sigma_n[a_1^n(b^n-a_2^n) + a_3^n] + \qquad (10)$$
$$\sigma_n^2\}, \text{ when } \sqrt{D_i^q} = b^n$$

Figure 5:
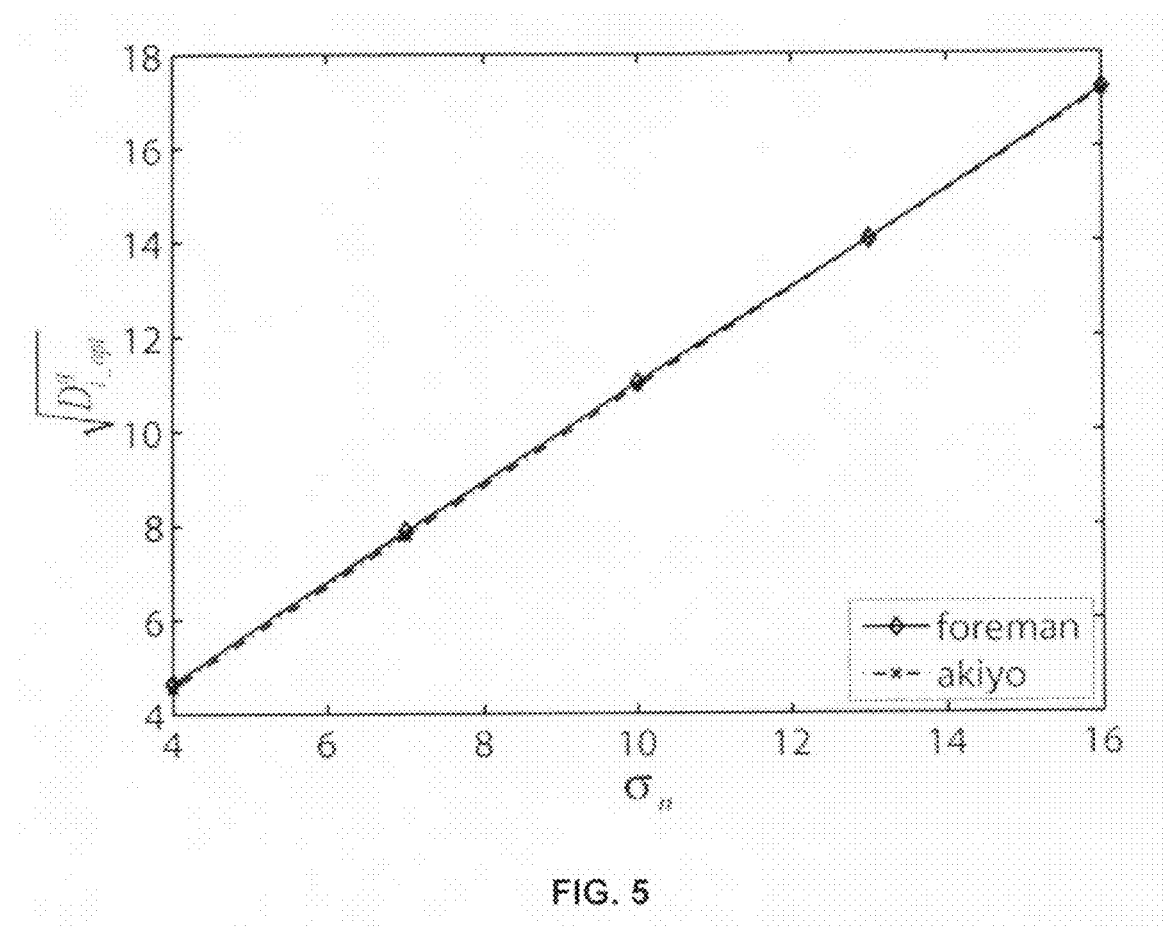
FIG. 5 shows the relationship between the square root of the optimal quantization distortion quantization distortion $\sqrt{D_i^q{}_{\_opt}}$ and noise variance $\sigma_n$.

According to Equations (6) and (10), we can see that the minimal value of $E(D_p)$ is achieved when $\sqrt{D_i^q}=b^n$. Let us denote this optimal $\sqrt{D_i^q}$ as $\sqrt{D_i^q{}_{\_opt}}$. As shown in FIG. 4, $b^n$ is determined by $\sigma_n$. Therefore, the optimal $\sqrt{D_i^q{}_{\_opt}}$, which minimizes $E(D_p)$, is determined by $\sigma_n$. FIG. 5 shows the relationship between the optimal $\sqrt{D_i^q{}_{\_opt}}$ and $\sigma_n$. We can see that the optimal $\sqrt{D_i^q{}_{\_opt}}$ can be approximated as a linear function of $\sigma_n$:

$$\sqrt{D_i^q{}_{\_opt}} = \theta\sigma_n + \epsilon \qquad (11)$$

In sufficiently high bit-rate situation, a reasonably well-behaved source probability distribution can be approximated as a constant within each quantization interval. This would lead to the typical bit-rate approximation (T. Wiegand et al., "Rate-constrained coder control and comparison of video coding standards," IEEE Trans. Circuits Syst. Video Technol., pp. 688-703, 2003):

$$D^q = \begin{cases} \dfrac{QP^2}{3}, \text{ for } H.263 \\ \dfrac{2^{\frac{QP-12}{3}}}{3}, \text{ for } H.264 \end{cases} \qquad (12)$$

Applicants relaxed the above equation into a more general approximation by introducing a parameter $\omega$ and the bit-rate approximation becomes:

$$D^q = \begin{cases} \dfrac{QP^2}{\omega}, \text{ for } H.263 \\ \dfrac{2^{\frac{QP-12}{3}}}{\omega}, \text{ for } H.264 \end{cases} \qquad (13)$$

According to Equations (11) and (13), $QP_0$ corresponding to $\sqrt{D_i^q{}_{\_opt}}$ can be generated as:

$$QP_0 = \begin{cases} \sqrt{\omega(\theta\sigma_n + \epsilon)^2}, \text{ for } H.263 \\ 3\log_2[\omega(\theta\sigma_n + \epsilon)^2] + 12, \text{ for } H.264 \end{cases} \qquad (14)$$

where
  $QP_0$ is an initial quantization parameter;
  $\sigma_n$ is the standard deviation of noise variance;
  $\omega, \theta$ and $\epsilon$ are introduced parameters; and
  H.263, and H.264 correspond to ITU-T H.263, and H.264 standards.

$$R^*(i) = \min\left\{R[QP_{lowbound}(i)], \sqrt{\frac{a}{\lambda^*}} MAD^2(i,t)\right\} \qquad (19)$$

where $$\sum_{(i=1)}^{N_{MB}} R^*(i) = R_t.$$

$$\tilde{R}(i) = \min\left(R[QP_{lowbound}(i)], \frac{R_t(i)MAD^2(i,t)}{\sum_{k=i}^{N_{MB}} MAD^2(k,t)}\right) \qquad (20)$$

From previous analysis, it is known that $QP_0$ is the quantization parameter corresponding to $\sqrt{D_i^q{}_{\_opt}}$ that minimizes the expectation of the square difference $E(D_p)$ between the original pixel $1_i$ and the reconstructed one $\tilde{I}_i^n$. In this process, the role of bit rate is not involved. Therefore, this $QP_0$ as a low bound quantization parameter is treated. Any reasonable QP should be equal to or larger than $QP_0$ with a smaller bit rate. A QP smaller than $QP_0$ will have a larger bit rate and larger distortion, which is not reasonable. Here, the low bound quantization parameter is denoted as $QP_{lowbound}$. Also, $QP_{lowbound}$ can be defined as follows:

$$QP_{lowbound} = QP_0 = \begin{cases} \sqrt{\omega(\theta\sigma_n + \epsilon)^2}, \text{ for } H.263 \\ 3\log_2[\omega(\theta\sigma_n + \epsilon)^2] + 12, \text{ for } H.264 \end{cases} \qquad (15)$$

The Proposed Simultaneously Rate Control and Video Denoising Algorithm

According to the above analysis, for different $\sigma_n^2$ noise, there is a different low bound quantization parameter $QP_{lowbound}$. The relationship between $QP_{lowbound}$ and $\sigma_n$ is shown in Equation (15). Intuitively, for noisy video that has spatially varying noise variance, we should generate spatially varying $QP_{lowbound}$ to achieve a best rate-distortion performance.

Based on this intuition, Applicants propose two rate control schemes to simultaneously denoise and compress the noisy video that has spatially varying noise variance: one is exhaustive search based rate control scheme and the other is optimization based rate control scheme.

1. Exhaustive Search Based Control Scheme:

The detailed procedures of the exhaustive search based rate control scheme are described as follows.

1) First, estimating a noise variance for each macroblock.
2) Then, based on the estimated noise variance, computing a $QP_{lowbound}$ by Equation (15) and using it as an initial QP for each macroblock. By doing this, an initial QP map, which will be used in the further rate control, is created for each frame.
3) Based on the QP map, encoding the frame and generating the actual bitrate R. If the bitrate is not larger than the target bitrate $R \leq R_{target}$, the bitstreams are outputted. If $R > R_{target}$, the smallest $QP_i$ in the QP map are increased and returned to step 3).

2. Optimization Based Rate Control Scheme:

For the MB level rate allocation problem, minimization of the overall distortion of the current frame under the constraint that the overall bitrate is equal to $R_t$ is desired. Also, the traditional MB level rate allocation problem for the noise-free video can be formulated as follows:

$$\min_{R(i)} \sum_{i=1}^{N_{MB}} D(R(i)), \text{ s.t. } \sum_{i=1}^{N_{MB}} R(i) = R_t \quad (16)$$

where $D(R(i))$ is the distortion of the $i^{th}$ MB given that the rate of the $i^{th}$ MB is $R(i)$.

According to the previous discussion, in order to perform video de-noising using rate distortion optimization, the quantization parameter QP should be set to be larger than $QP_{lowbound}$. Therefore, we can integrate the de-noising problem and rate control problem by solving the following optimization problem:

$$\min_{R(i)} \sum_{i=1}^{N_{MB}} D(R(i)), \text{ s.t. } \sum_{i=1}^{N_{MB}} R(i) = R_t; R(i) \leq R(QP_{lowbound}(i)). \quad (17)$$

For any reasonable rate distortion relationship, the corresponding solution for the rate allocation problem can be found by solving the optimization problem above. Here, the rate distortion relationship in H.264 is used as an example. As shown in Y. Chen and O. Au, "Simultaneous RD-Optimized rate control and video de-noising," in *IEEE Int. Conf. Acoustics, Speech, Signal Processing*, 2008, the MB level rate distortion relationship in H.264 can be approximated as $$D(i) = \alpha \frac{MAD^4(i, t)}{R(i)}.$$

Therefore, the optimization problem becomes:

$$\min_{R(i)} \sum_{i=1}^{N_{MB}} a \frac{MAD^4(i, t)}{R(i)} \text{ s.t. } \sum_{i=1}^{N_{MB}} R(i) = R_t; R(i) \leq R(QP_{lowbound}(i)). \quad (18)$$

Obviously, the optimization problem above is a convex optimization problem. The optimal solution can be generated by solving the KKT conditions:

$$R^*(i) = \min\left[[R(\square]QP_{lowbound}(i)), \sqrt{\frac{\alpha}{\lambda^*}} MAD^2(i, t)\right] \quad (19)$$

where $$\sum_{i=1}^{N_{MB}} R^*(i) = R_t.$$

The optimal solution can be found through an iterative form of finding $\lambda^*$. However, since it is too complex, a suboptimal solution is used instead. An approximate Lagrangian parameter $$\tilde{\lambda} = \left(\frac{\sqrt{a} \sum_{i=1}^{N_{MB}} MAD^2(i, t)}{R_t}\right)^2,$$

which is actually the optimal Lagrangian parameter of the optimization problem in equation (16) with $$D(i) = \alpha \frac{MAD^4(i, t)}{R(i)},$$

is used. Then, the suboptimal solution $\tilde{R}(i)$ is:

$$\tilde{R}(i) = \min\left[([R(QP_1 lowbound(i), (R_1 t(i)] MAD^1 2(i,t)) / (\Sigma_1(k=i)^t(N_1 MB) = [(MAD^1_2(k,t))])]\right] \quad (20)$$

Experimental Results

The proposed simultaneous rate control and video de-noising algorithm is evaluated based on modified H.264 JM 9.0. In order to simulate the noising process, the clean video sequences are first manually distorted by adding Gaussian noise. We assume that one slice contains one row MBs and each slice has a possibility p to be corrupted by Gaussian noise and possibility 1-p to be error-free. Then, the noisy videos are input to the video encoder. The video sequences "Foreman" and "Carphone" in QCIF format are tested. In all experiments as conducted, parameters ω, θ, and ε are set to be 1.694, 1.049, and 0.445, respectively (Y. Chen, "Video Denoising and Error Concealment for Robust Video Communication," in *Master Thesis*, 2007). In the following, the results of $\sigma_n^2 = 100$ and p=0.4 will be shown. Similar results are obtained using different $\sigma_n^2$ and p. The PSNR is computed by comparing with the original video sequence.

Figure 6:
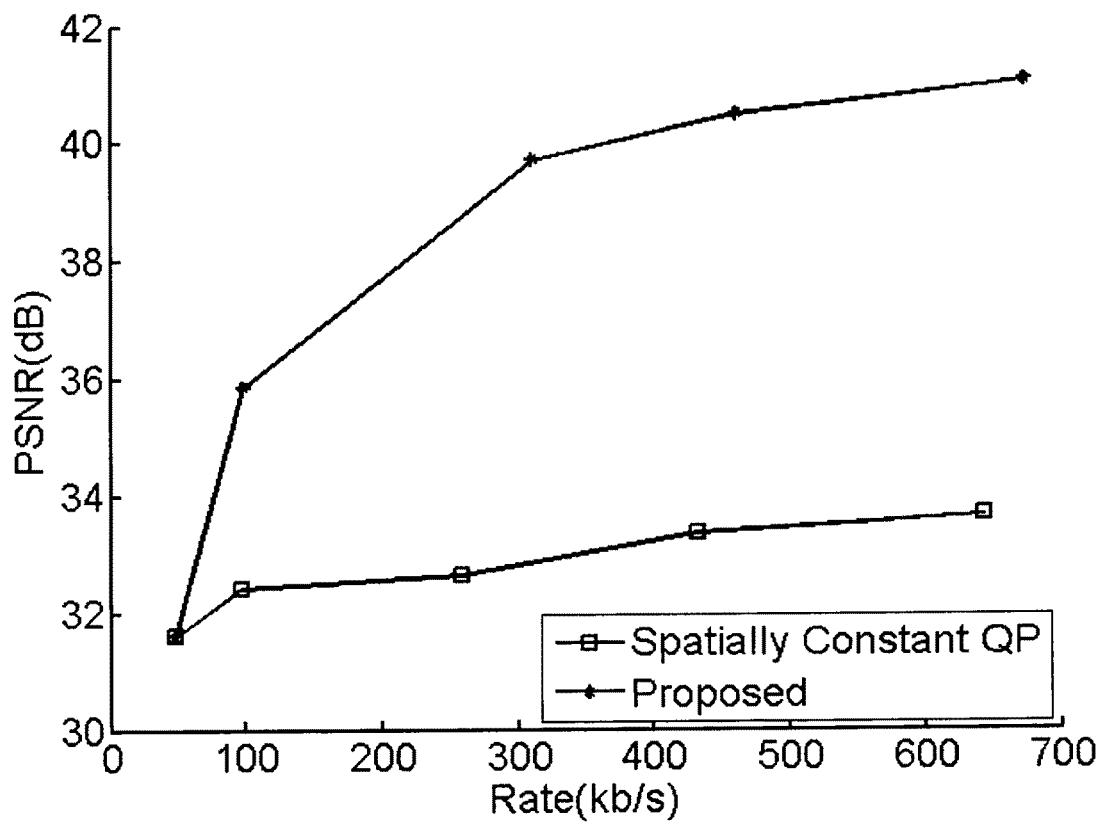
FIG. 6 shows rate distortion performance comparison between a method using a spatially constant QP and the proposed method.
Figure 7:
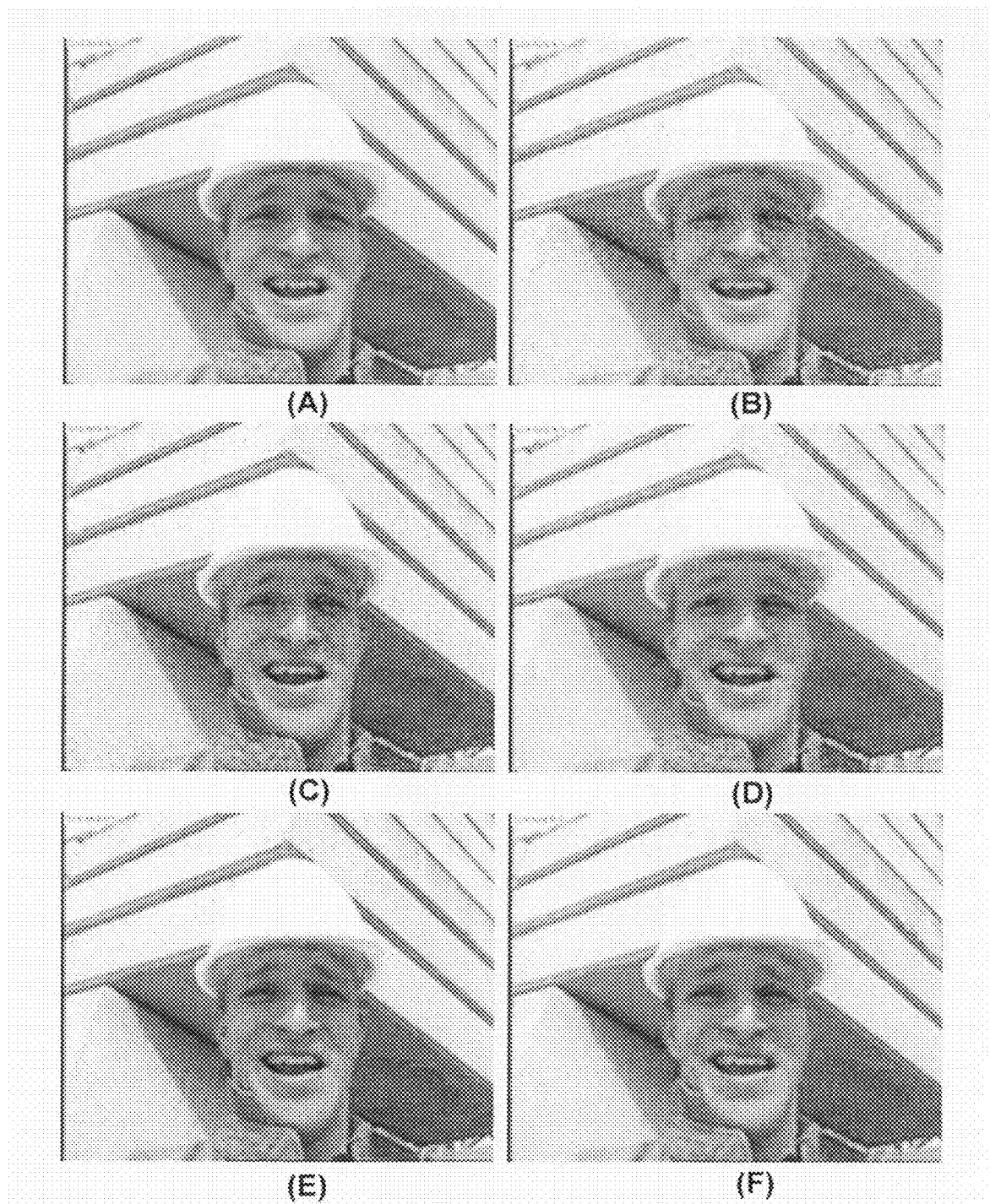
FIG. 7 shows subjective visual quality comparison.

In the first experiment, the proposed exhaustive search based rate control scheme is compared with H.264 encoder using spatially constant QP. The rate distortion performance is shown in FIG. 6. It can be seen that the proposed method has much better performance and can gain up to 7 dB, compared with the method using a spatially constant QP. The subjective visual quality is also examined in FIG. 7, where FIGS. 7(*a*) and 7(*b*) are the original and noisy frames. FIGS. 7(*c*) and 7(*d*) are the results reconstructed by using spatially constant QP=24 and QP=32, respectively, while FIGS. 7(*e*) and 7(*f*) are the results generated using the current spatially adaptive QP method. Applicants used QP=35 for the noisy slices for both FIGS. 7(e) and 7(f). For error-free slices, Applicants used QP=12 and QP=26 for FIGS. 7(e) and 7(f), respectively. The corresponding (bitrates (kb/s), PSNR (dB)) for FIGS. 7(c)-7(f) are (432.67, 33.37), (97.72, 32.43), (461.53, 40.51), and (98.04, 35.86), respectively. It can be seen that, by using the proposed spatially adaptive QP rate control method, not only the noise in the noisy slices is greatly reduced, but also the detail information in the error-free slices can be well-preserved. On the contrary, using spatially constant QP method will not only have a poor denoising performance for the noisy slices but also introduce serious distortion to the error-free slices. Notice that the artifacts not only come from the compression distortion of current frame but also from the distortion propagation of previous frames.

Figure 8A:
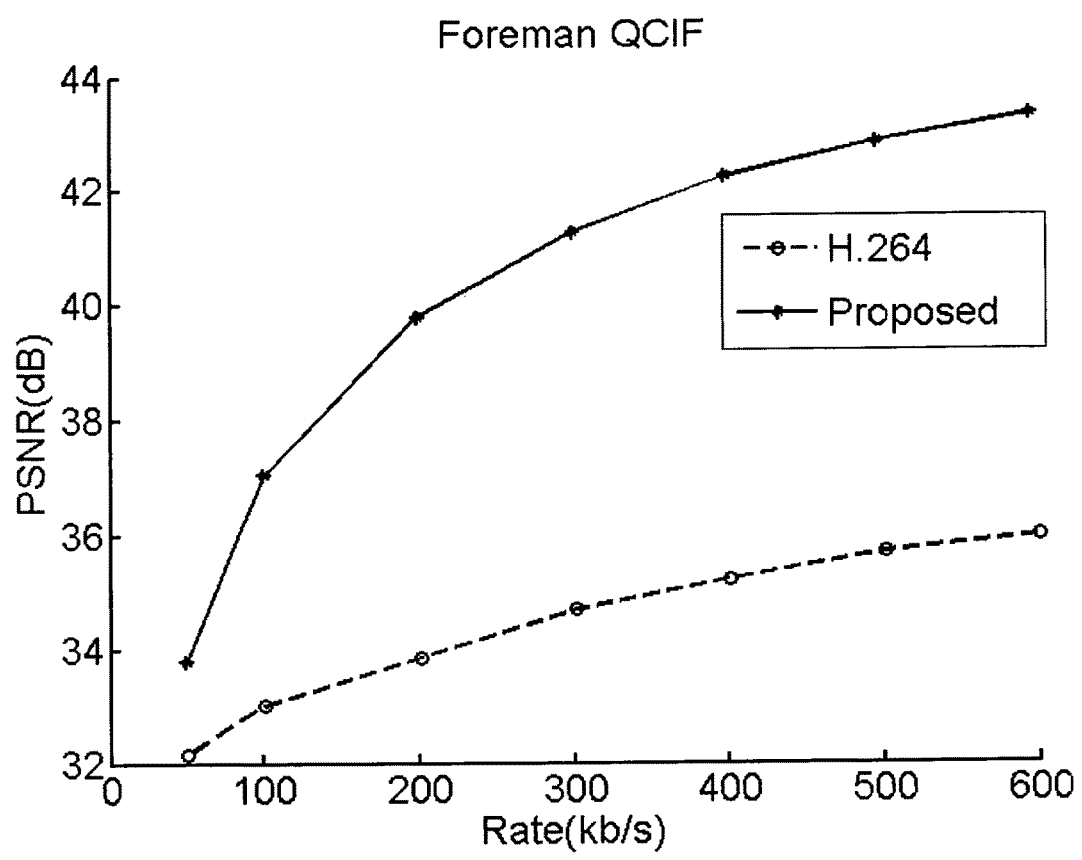
FIG. 8(a) is for "Foreman"
Figure 8B:
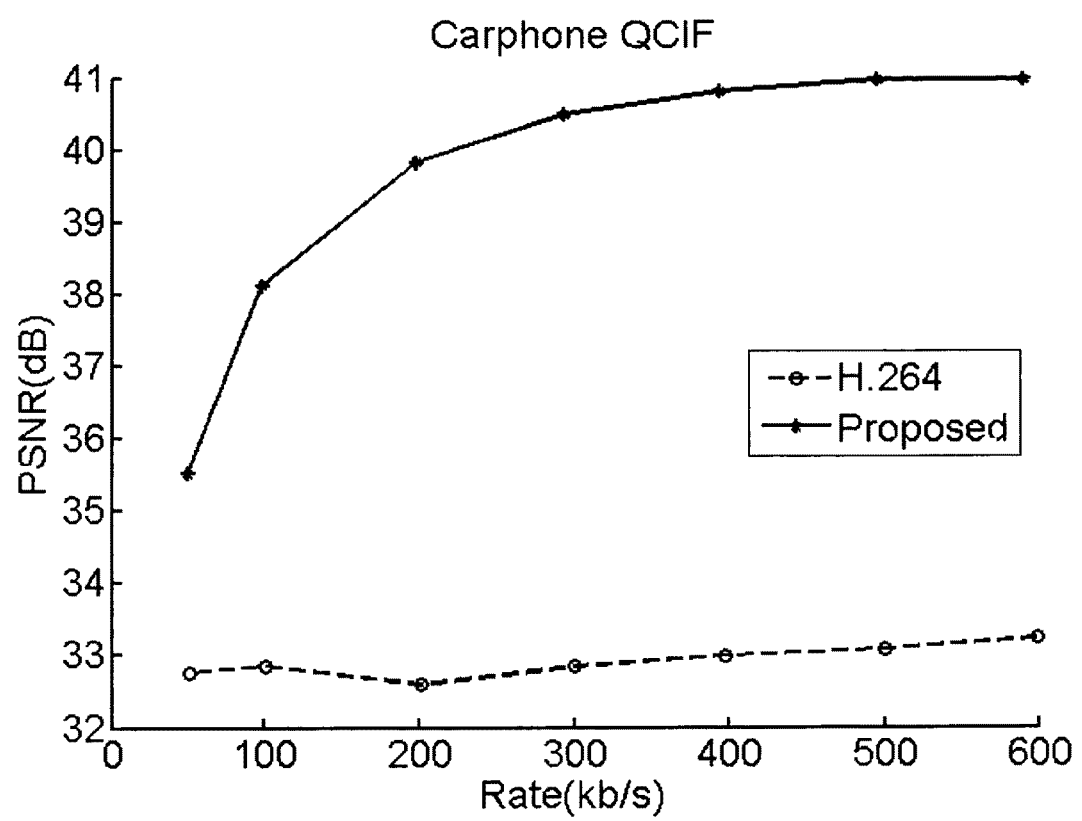
FIG. 8(b) is for "Carphone."
Figure 9:
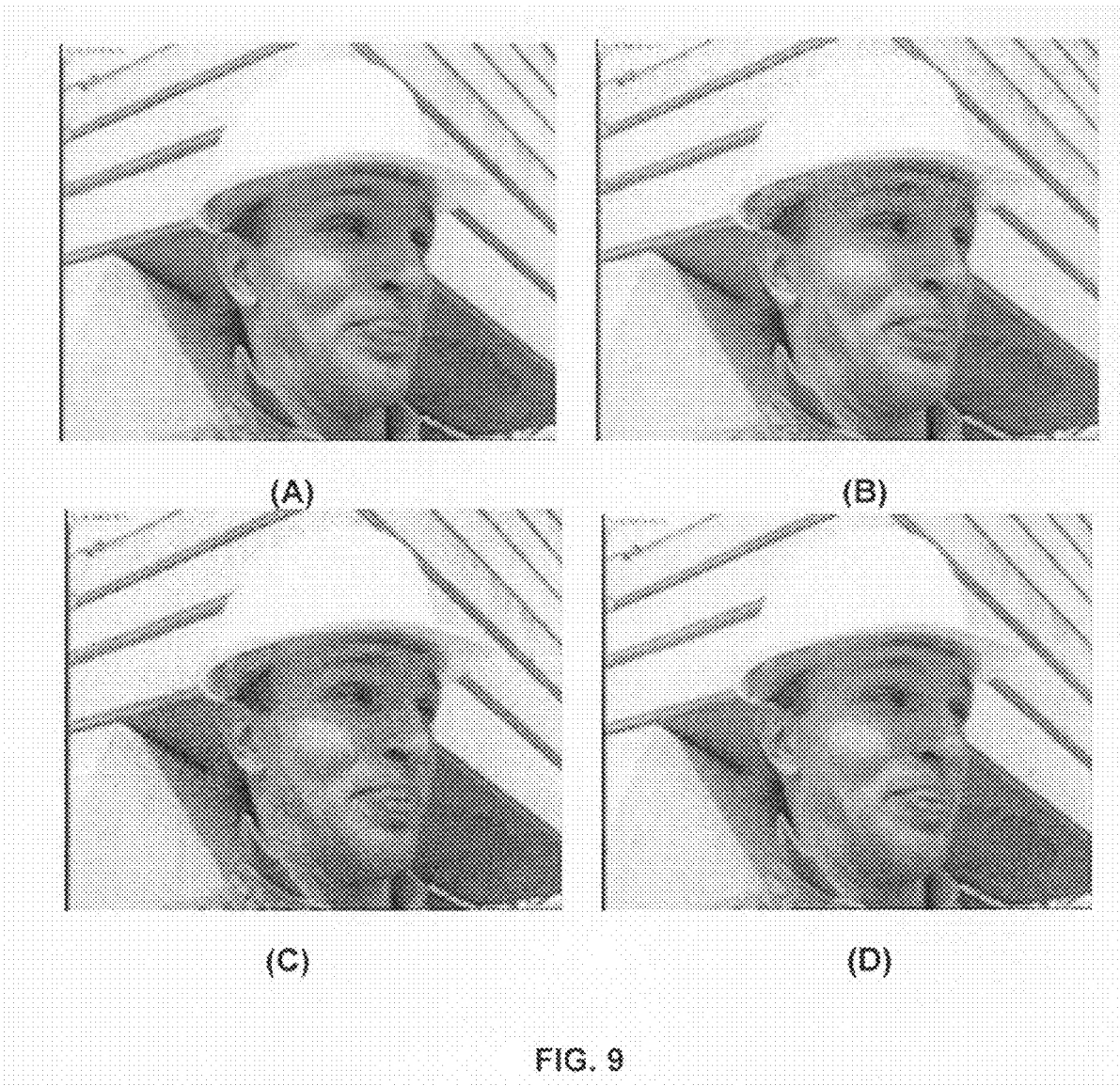
FIG. 9 shows quality comparison for "Foreman"
Figure 10:
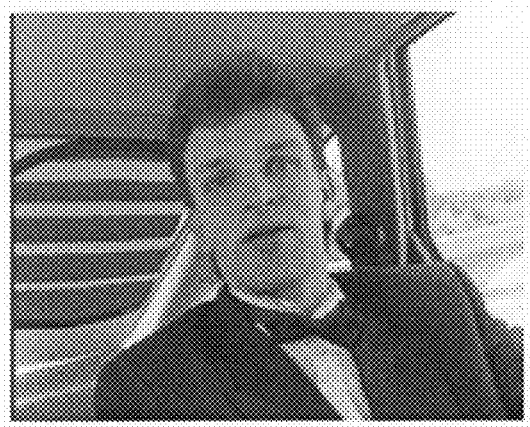
FIG. 10 shows quality comparison for "Carphone"
Figure 10:
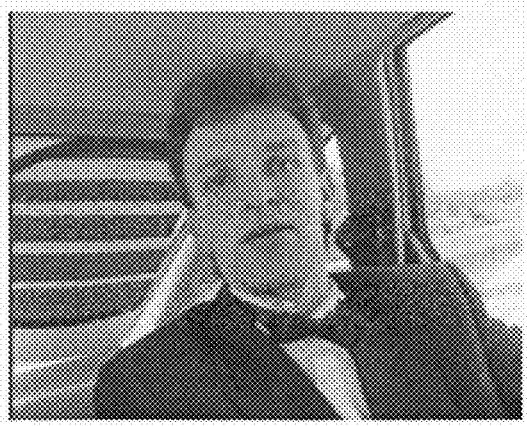
Figure 10:
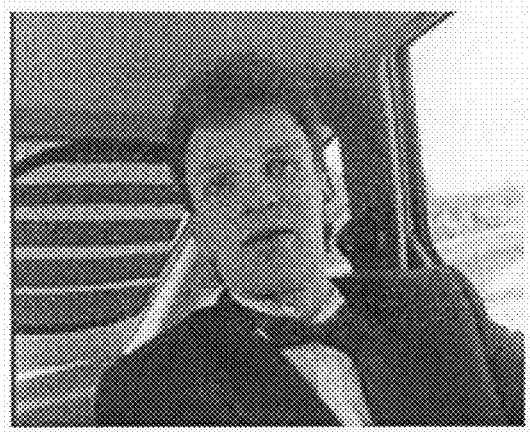
Figure 10:

In the second experiment, the proposed optimization based rate control scheme is compared with the rate control method in H.264 (Z. G. Li, F. Pan, K. P. Lim, and S. Rahardja, "Adaptive Rate Control for H.264,"in *Proc. IEEE International Conference on Image Processing*, 2004). The rate distortion performance is shown in FIG. 8. It can been seen that the PSNR performance of the proposed method is much better than that of the method in H.264, especially at high bit-rate situation. Up to 7.88 dB gain can be obtained. The subjective visual quality is also examined in FIGS. 9 and 10, where FIGS. 9(a) and 10(a) and FIGS. 9(b) and 10(b) are the original and noisy frames, respectively. FIGS. 9(c) and 10(c) are the results reconstructed by the rate control method in H.264 while FIGS. 9(d) and 10(d) are the results generated using the proposed method at bit-rate about 300 kb/s. It can be seen that by using the proposed rate control method, not only the noise in the noisy slices is greatly reduced, but also the detail information in the error-free slices can be well-preserved. On the contrary, using the rate control method in H.264 will not only have a poor denoising performance for the noisy slices but also introduce serious distortion to the error-free slices. Notice that the artifacts not only come from the compression distortion of current frame but also from the distortion propagation of previous frames.

The present subject matter can be used in all practical video processing systems. Particularly, all video encoder/transcoder (e.g., H.263, H.264, MPEG-4, AVS, etc) that require regulating the output rate can use the present subject matter. One can incorporate this subject matter into his/her products to improve the coding efficiency and subjective quality of video sequences. In addition, when the noise variance is large, one may integrate other pre-filtering-based denoising method for high bitrate situation.

Although the subject matter has been described with reference to the illustrated embodiment, the subject matter is not limited thereto. The subject matter being thus described, it will be obvious that the same may be varied in many ways. Such variations are not to be regarded as a departure from the spirit and scope of the subject matter, and all such modifications as would be obvious to one skilled in the art are intended to be included within the scope of the following claims.

What is claimed is:
1. A method for simultaneously performing rate control and video denoising for video corrupted by noise, comprising the steps of:
receiving video data (I″) including original video data (I) and noise data (n);
estimating a variance of the noise data for each macroblock within a frame;
generating a low bound quantization parameter ($QP_{lowbound}$) based on the estimated noise variance; and
using the low bound quantization parameter ($QP_{lowbound}$) to reconstruct the video data such that distortion between the original video data (I) and reconstructed video data (Î″) is minimized over each macroblock within a frame and using the low bound quantization parameter ($QP_{lowbound}$) to regulate data output rate simultaneously with the minimizing of the distortion.

2. The method of claim 1, wherein the minimization of the distortion between the original video data and reconstructed video data is implemented using a quantization parameter (QP) that is equal to or larger than the low bound quantization parameter ($QP_{lowbound}$).

3. The method of claim 1, wherein the low bound quantization parameter is calculated as a function of a quantized distortion (Dp).

4. The method of claim 3, wherein the distortion between the original video data and reconstructed video data is represented by an expected distortion (E(Dp)) that is a function of the quantized distortion.

5. The method of claim 4, wherein the expected distortion is minimized when the square root of the quantized distortion is equal to a parameter (b″) determined by the noise variance.

6. A method for simultaneously performing rate control and video denoising for video corrupted by noise, comprising the steps of:
receiving video data (I″) including original video data (I) and noise data (n);
estimating a variance of the noise data for each macroblock within a frame;
generating a low bound quantization parameter ($QP_{lowbound}$) based on the estimated noise variance; and
using the low bound quantization parameter ($QP_{lowbound}$) to reconstruct the video data such that the distortion between the original video data (I) and reconstructed video data (Î″) is minimized over each macroblock within a frame,
wherein the low bound quantization parameter is calculated as a function of a quantized distortion (Dp),
wherein the distortion between the original video data and reconstructed video data is represented by an expected distortion (E(Dp)) that is a function of the quantized distortion,
wherein the expected distortion is minimized when the square root of the quantized distortion is equal to a parameter (b″) determined by the noise variance, and
wherein the low bound quantization parameter ($QP_{lowbound}$) is calculated by the following equation:

$$QP_{lowbound} = \begin{cases} \sqrt{\omega(\theta\sigma_n + \varepsilon)^2}, \text{ for } H.263 \\ 3\log_2[\omega(\theta\sigma_n + \varepsilon)^2] + 12, \text{ for } H.264 \end{cases}$$

where
$QP_0$ is an initial quantization parameter;
$\sigma_n$ is the standard deviation of noise variance;
$\omega, \theta$ and $\varepsilon$ are introduced parameters; and
H.263, and H.264 correspond to ITU-T H.263, and H.264 standards.

7. The method of claim 2, wherein the bitstreams of the reconstructed video data are outputted, if the actual bitrate (R) is not larger than a predetermined bitrate ($R_{target}$).

8. The method of claim 7, wherein the reconstruction of the video data is implemented based on a QP map that includes a $QP_i$, corresponding ith macroblock within the frame.

9. The method of claim 8, wherein the smallest $QP_i$ in the QP map is increased, if the actual bitrate is larger than the predetermined bitrate.

10. The method of claim 1, further comprising:
controlling the data output rate of reconstructed video data ($\hat{I}''$) based on the low bound quantization parameter.

11. The method of claim 10, wherein the steps of determining the low bound quantization parameter and controlling the data output rate of reconstructed video data are implemented by a same component.

12. A non-transitory computer-readable medium containing a computer program for encoding noisy video data that include original video data and noise data, said computer program comprising:
first code for estimating a variance of the noise data for each macroblock within a frame;
second code for generating a low bound quantization parameter ($QP_{lowbound}$) based on the estimated noise variance; and
third code for reconstructing the video data by using the low bound quantization parameter ($QP_{lowbound}$) such that distortion between the original video data and reconstructed video data is minimized over each macroblock within a frame and for using the low bound quantization parameter ($QP_{lowbound}$) to regulate data output rate simultaneously with the minimizing of the distortion.

13. The computer-readable medium of claim 12, wherein the minimization of the distortion between the original video data and reconstructed video data is implemented using a quantization parameter that is equal to or larger than the low bound quantization parameter.

14. The method of claim 1, further comprising: reconstructing the video data such that the distortion between the original video data (I) and reconstructed video data ($\hat{I}''$) is minimized by determining an optimal value ($R_t$) for a bitrate of each macroblock.

15. The method of claim 14, wherein the optimal value for the bitrate of each macroblock is generated by solving the following equation:

$$R^*(i) = \min\left\{R[QP_{lowbound}(i)], \sqrt{\frac{a}{\lambda^*}} MAD^2(i,t)\right\}$$

where $$\sum_{(i=1)}^{N_{MB}} R^*(i) = R_t,$$

$R^*(i)$ is the optimal rate of the ith macroblock,
$QP_{lowbound}(i)$ is the low bound quantization step of the ith macroblock
$R[QP_{lowbound}(i)]$ is the estimated rate of the ith macroblock when the low bound quantization step is used
a is a constant parameter
$\lambda^*$ is the optimal Lagrangian parameter
MAD(i,t) is the predicted mean absolution difference of the i-the macroblock at frame t
$N_{MB}$ is the total number of macroblocks
$R_t$ is the target bit rate of frame t.

16. The method of claim 14, wherein the optimal value for the bitrate of each macroblock is approximated by the following equation:

$$\tilde{R}(i) = \min\left(R[QP_{lowbound}(i)], \frac{R_t(i)MAD^2(i,t)}{\sum_{k=i}^{N_{MB}} MAD^2(k,t)}\right),$$

where
$\tilde{R}(i)$ is the suboptimal rate of the ith macroblock,
$QP_{lowbound}(i)$ is the low bound quantization step of the ith macroblock
$R[QP_{lowbound}(i)]$ is the estimated rate of the ith macroblock when the low bound quantization step is used
MAD(i,t) is the predicted mean absolution difference of the i-the macroblock at frame t
$N_{MB}$ is the total number of macroblocks
$R_t(i)$ is the number of remain bits for the remaining MBs in the frame t.

* * * * *